US006959612B2

(12) United States Patent
May (10) Patent No.: US 6,959,612 B2
(45) Date of Patent: Nov. 1, 2005

(54) MAGNETIC-BASED TORQUE/SPEED SENSOR

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 0 days.

(21) Appl. No.: 10/258,275

(22) PCT Filed: May 17, 2001

(86) PCT No.: PCT/EP01/05705
§ 371 (c)(1),
(2), (4) Date: Jan. 27, 2003

(87) PCT Pub. No.: WO01/90711
PCT Pub. Date: Nov. 29, 2001

(65) Prior Publication Data
US 2004/0031332 A1 Feb. 19, 2004

(30) Foreign Application Priority Data
May 19, 2000 (GB) .............................................. 0012226

(51) Int. Cl.$^7$ ................................................. G01L 3/02
(52) U.S. Cl. ................................................. 73/862.331
(58) Field of Search ..................... 73/862.331, 862.332, 73/862.333

(56) References Cited
U.S. PATENT DOCUMENTS

| 4,047,047 A | * | 9/1977 | Boysen ........................ 307/106 |
| 4,697,460 A | | 10/1987 | Sugiyama et al. ......... 73/862.36 |
| 4,748,387 A | * | 5/1988 | Tanuma et al. .............. 318/254 |
| 4,790,492 A | * | 12/1988 | Atobe ......................... 242/223 |
| 4,805,466 A | * | 2/1989 | Schiessle et al. ....... 73/862.336 |
| 5,269,178 A | | 12/1993 | Vigmostad et al. ............ 73/116 |
| 5,412,999 A | | 5/1995 | Vigmostad et al. ..... 73/862.333 |
| 5,444,369 A | * | 8/1995 | Luetzow ................... 324/207.2 |
| 6,513,395 B1 | * | 2/2003 | Jones ..................... 73/862.333 |
| 6,568,284 B1 | * | 5/2003 | Reichl et al. ........... 73/862.333 |

* cited by examiner

Primary Examiner—Max Noori
(74) Attorney, Agent, or Firm—Blank Rome LLP (57) ABSTRACT

Torque is measured in the chain wheel (50) of a pedal cycle by a non-contacting magnetic-based transducer. A magnetising source (70), a D.C. type of source such as a permanent magnet is positioned adjacent the chain wheel (50) to induce an arcuate magnetised zone (72) in the wheel (50) as it rotates. The zone emanates a torque-dependent magnetic-field component that is detectable by a sensor (74) that follows the source (70) in the direction of rotation. By having the magnetising source (70) continually in position the arcuate tranducer zone (72) is refreshed on each rotation of the chain wheel. The nature of the pulsating torque in the chain wheel due to the exertion of the rider and its relationship to the angle of the pedal cranks is discussed with a preference for positioning the source (70) and sensor (74) at positions of minimum and maximum exerted torque respectively. If the induced arcuate magnetisation is interrupted (76) pulses for measuring rotational speed are obtainable. The torque measurement is of general application to torque in sprocket wheels or gear wheels.

19 Claims, 7 Drawing Sheets

MAGNETIC-BASED TORQUE/SPEED SENSOR

FIELD OF THE INVENTION

This invention relates to a torque sensor arrangement in which torque is transmitted between two parts rotatable about an axis. The parts may be located at the same radius and mechanically coupled together, and more generally may be two axially spaced parts at the same or different radii. Of more immediate interest are parts located at different radii and radially coupled for the transmission of torque from one to the other. Of particular interest is where the parts lie essentially in a plane such as in a disc form of structure, for example a sprocket wheel.

The invention also relates to a rotational speed sensor arrangement which incorporable as part of a torque sensor arrangement but which can be independently applied without being directly involved in torque transmission.

BACKGROUND TO THE INVENTION

A magnetically-based torque sensor arrangement for a disc-like structure is described in U.S. Pat. No. 4,697,460 (Sugiyama et al). This patent discloses an arrangement for torque measurement in an automobile transmission. An energiser coil/detection coil assembly is non-contactingly placed adjacent a disc in which torque stress occurs. The energizing coil is A.C. energised to establish an alternating magnetic flux in a flux path through the disc that is torque sensitive. The detection coil senses torque-dependent changes in the circulating magnetic flux.

Another magnetically-based torque sensor arrangement for a disc-like structure such as a sprocket wheel is disclosed in PCT application WO01/13082 published $22^{nd}$ Feb., 2001. This application discloses structures in which a permanent or stored magnetisation is associated with the disc to emanate a torque-dependent magnetic field component. The annular magnetisations employed for this purpose are further discussed below with reference to FIGS. 1–5.

A contrast can be drawn between using the disc structure as a medium for the A.C. coupling of an excitation coil to a detector and the use of stored or permanent magnetisation which itself can be regarded more as a D.C. type of magnetisation. This may be referred to herein as D.C. magnetisation.

The invention has particular, though not exclusive application, to torque transmission arrangements which, in operation, transmit torque in a pulsating or cyclic manner such as is found in the transmission of torque from the pedal cranks of a pedal cycle to the chain-engaging teeth of the pedal sprocket wheel, usually referred to as the chain wheel. In this case the torque is transmitted between an inner hub portion of the chain wheel and an outer annular tooth-bearing portion. The drive provided by the leg motion of the cyclist tends to approach zero when the pedal cranks are vertical, assuming the force exerted by the driving foot is vertically down. Without going into details of cycling motion and mechanics, it has been found that the maximum torque is usually exerted on the descending pedal crank in an arc extending to each side of the horizontal, though the arc may tend to advance (ascend) depending on the manner in which the cycle is being ridden. The generation of torque by the cyclist is made more complex because the rotational mounting of the pedals itself provides another free axis. The rider can angle the pedals to obtain the maximum mechanical input. Additionally the position of the rider is relevant, e.g. as between normal upright riding and a racing position. This maximum torque phase occurs twice for each revolution of the pedal cranks, once as each crank reaches the maximum transmission arc. This may be referred to as the maximum torque phase.

Heretofore it has not been possible to reliably and economically ascertain the torque transmitted in a chain wheel while the cycle is being ridden in normal use, and particularly the torque exerted in the maximum torque phase. More particularly it is desirable to be able to make such a measurement under normal cycling use without inconveniencing the cyclist.

The practice of the present invention provides a magnetically-based, non-contacting form of torque sensor arrangement having a magnetised transducer region which provides a torque-dependent magnetic field component and a non-contacting magnetic sensor. The preferred practice provides for automatic refreshment or compensation of the torque-dependent magnetic field which is to be sensed. The invention may be implemented to provide rotational speed measurement as well as torque sensing. The speed measurement may be implemented of its own right. The invention has particular application to cranks that are manually driven by hand (arm) or foot (leg) in which the torque generated is generally not uniform throughout the rotation of the crank and may also be applied in engine driven systems where the torque applied to a rotary shaft is non-uniform. In particular the applied torque may be pulsating, varying between maximum and minimum torque phases: in the case of a pedal cycle there are two pulses for each revolution of the chain wheel. The invention will be further described in relation to pedal bicycle.

The need for a reliable measurement of torque in normal use has arisen as a means of gauging the effort expended by a cyclist in propelling the machine. It has been proposed to assist the rider of a pedal cycle by providing a motor drive by way of an electric motor powered by a battery carried by the cycle. The battery should be as compact and light as possible consistent with providing the drive energy required for reasonable periods. Raising battery capacity increases weight. To obtain the best use of battery life, it is desirable that the cycle should not be propelled solely by the battery energy for extended periods but that the battery energy should be called on to supplement the energy of the cyclist. The battery energy is only utilised provided the cyclist is providing at least a certain threshold propulsion energy. The energy supplied by the rider can be gauged by the torque exerted on the chain wheel driving the cycle chain. The present invention enables us to provide a solution to the torque measurement problem which can be then used in controlling the energisation of the electric motor.

SUMMARY OF THE INVENTION

Underlying the present invention is the concept of measuring torque in a gear or sprocket wheel, such as a bicycle chain wheel, by maintaining a magnetising source adjacent, but preferably not in contact with, the wheel as it rotates so that an arcuate zone of magnetisation is generated—this is a D.C. type of magnetisation in the terms discussed earlier—which zone is sensitive to torque in respect of a magnetic field or field component associated with it. This field or field component is detected by a magnetic field sensor. By having the source continuously in place the induced magnetisation in the wheel is refreshed or renewed on each rotation of the wheel. By this means subsequent events otherwise deleterious to a permanently magnetised transducer zone reliant solely on its own magnetisation can be overcome.

The concept outlined above finds particular benefit in a wheel, such as a pedal cycle chain wheel, in which the wheel is subject to a pulsating torque in each cycle of rotation and where it is desired to measure the maximum torque exerted. To this end it is preferred to effect the magnetisation at a point of low torque in the cycle and to detect the torque-dependent field at a point of high torque.

By interrupting the induced magnetisation in the wheel a speed-indicative component is obtainable. This feature can be implemented on its own or in combination with the torque measurement.

Aspects and features of this invention for which protection is presently sought are set forth in the claims following this description.

The invention and its practice will be further described by way of embodiments applied to pedal cycles.

BRIEF DESCRIPTION OF THE DRAWINGS

In the accompanying drawings:

FIGS. 8 and 9 illustrate the torque generation phases for different rider efforts in riding according to FIG. 7a;

DESCRIPTION OF PRIOR PROPOSAL

Before discussing the particular application of the invention to a pedal cycle or a similar application, the following description with reference to FIGS. 1–4b explains the arrangement and operation of a magnetic-based, non-contacting torque sensor applied to a sprocket wheel or gear wheel through which torque is transmitted and of which a cycle chain wheel is an example. There will be described a non-contacting torque sensor having a non-contacting magnetic source and a non-contacting magnetic field sensor.

Figure 1:
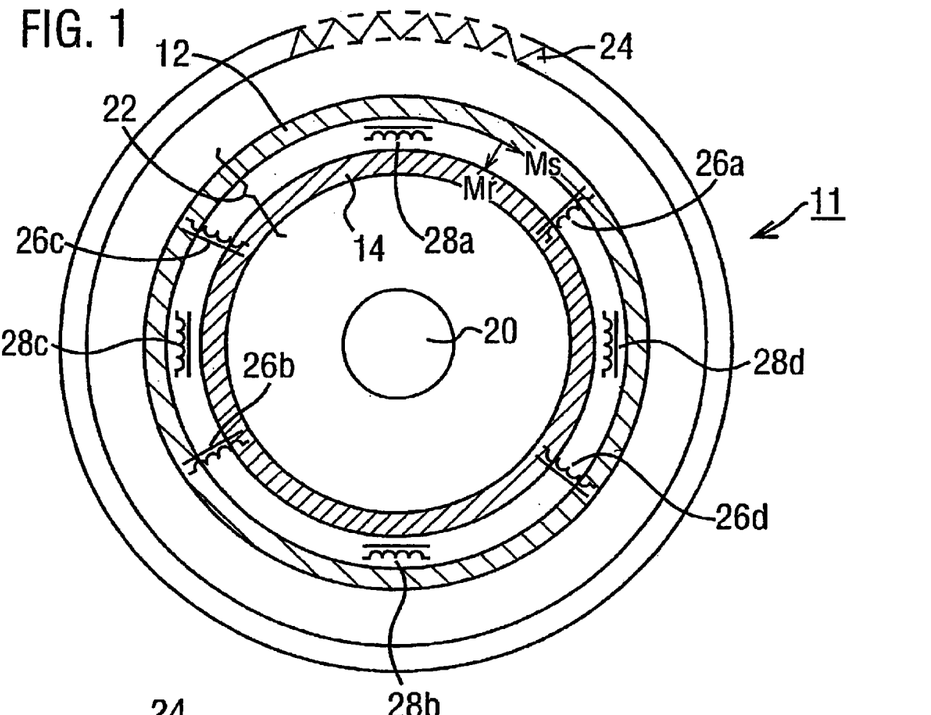
FIG. 1 is a face view of a sprocket or gear wheel in which two annular, radially-spaced magnetisation zones are established to provide an external torque-dependent magnetic field.
Figure 2:
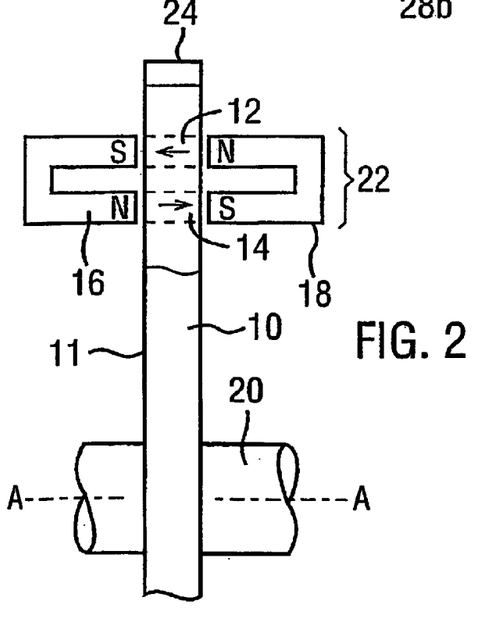
FIG. 2 is a partial axial section through the sprocket wheel and also shows one magnetisation source for creating the two annular axially magnetised zones.
Figure 3:
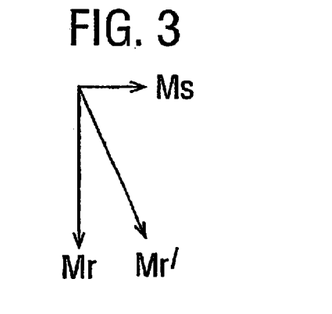
FIG. 3 is a diagrammatic representation of the generation of the sensed torque-dependent magnetic field.

According to WO01/13082 above-mentioned, a proposal to measure torque in a sprocket wheel is illustrated in FIGS. 1–3. These figures illustrate the sprocket wheel as a solid disc in which annular magnetised zones are provided to provide a region acting as an annular transducer element providing a torque-dependent magnetic field output. The magnetised zones can be established in various ways. The forms of magnetisation illustrated in FIGS. 1 and 2, 4 and 5 are radially-spaced magnetisations. They are permanent (remanent) or stored magnetisations from which a D.C. magnetic field is emanated under torque.

Looking first at FIGS. 1 and 2, a sprocket wheel comprises a circular disc 10, which for present purposes is taken to be a solid disc. The disc 10 is centrally mounted on a shaft 20 rotatable about an axis A—A. The disc thus has a pair of faces extending transversely, specifically normally, of the axis. Around its outer periphery or circumference the disc has teeth 24 designed to engage a chain or the teeth of another gear wheel. Rotational drive may be applied from the shaft 20 outwardly through the disc to the teeth 24 or vice versa. The transmission of drive through the disc generates a torque in the disc whose magnitude is to be sensed. For this purpose a magnetic-based, non-contacting sensor or transducer assembly is employed. The sensor has a transducer region 22 comprised of magnetised zones 12 and 14 established in the disc which provide an externally detectable torque-dependent magnetic field. The region 22 lies between the shaft 20 and the peripheral teeth 24 so that the applied torque is transmitted through the transducer region. To this end the disc is formed of a magnetisable material, at least where the transducer region is provided. The external field is detected by non-contacting magnetic field sensing devices which, for example, may be of the saturating core type, Hall device type or magneto-resistive type. It is preferred that directional sensor devices are used that can be oriented with the direction of the field to be sensed.

FIG. 2 shows the provision of a magnet system comprising magnets 16 and 18 on opposite sides of the disc to establish the two annular magnetised zones 12 and 14. Each zone is established as an annulus about the axis A—A, as by rotating the disc between the magnets. Each zone is longitudinally magnetised in that the magnetisation extends in the axial direction and the two zones 12 and 14 have opposite polarities of magnetisation as indicated by the arrows in FIG. 2. The two magnetised zones provide the transducer region 22 (the magnets 16, 18 being removed) which from face 11 of the disc 10, say, appears as shown in FIG. 1. At the surface 11 zone 12 provides an annular pole (N) of one polarity and zone 14 an annular pole (S) of the opposite polarity between which an exterior magnetic flux Mr (FIG. 3) is established to link the poles. The exterior magnetic field vector is radial at any point around the annuli. Under torque the vector is deflected or skewed from the radial to a position Mr' to provide a circumferential or tangential component Ms which extends around the annulus. Ms is a function of torque and has a zero value at zero torque.

FIG. 1 also shows sensors 28a–28d oriented for detecting the torque dependent circumferential component $M_s$ and sensors 26a–26d oriented for detecting the radial component Mr used as a reference. The sensors are of the saturating core type which have an inherent optimum response in the direction of the axis of the core. A suitable sensor circuit of this type is that described published International Patent Application publication number WO98/52063. Although four sensors are shown for detecting each of fields Mr and Ms, this is not essential. One sensor for each field will suffice. However, there is advantage in using at least one pair of diametrically opposed sensors in which the inductors can be so connected as to additively respond to the wanted Mr or Ms component while acting to cancel external ambient fields such as the Earth's magnetic field.

Referring to FIG. 2, the zones 12 and 14 are magnetised to saturation so as to retain remanent permanent magnetisation when the magnets 16, 18 are removed. In FIG. 1 all the field sensing devices are adjacent face 11. To enhance the external field available at face 11, the other face can be provided with a low reluctance annular bridge or keeper magnetically connecting zones 12 and 14 at that face. Another possibility is the modification shown in FIG. 4a where the disc 10 is subject to a single magnet source at one side, e.g. the magnet 16 adjacent face 11 to produce a magnetised zone 23 closed within the material of the disc as indicated by the dotted lines with two radially spaced annular poles 12' and 14' of opposite polarity between which, as in FIG. 3, an external reference radial field Mr exists and a torque-dependent circumferential or tangential field Ms is produced under torque.

Figure 4A:
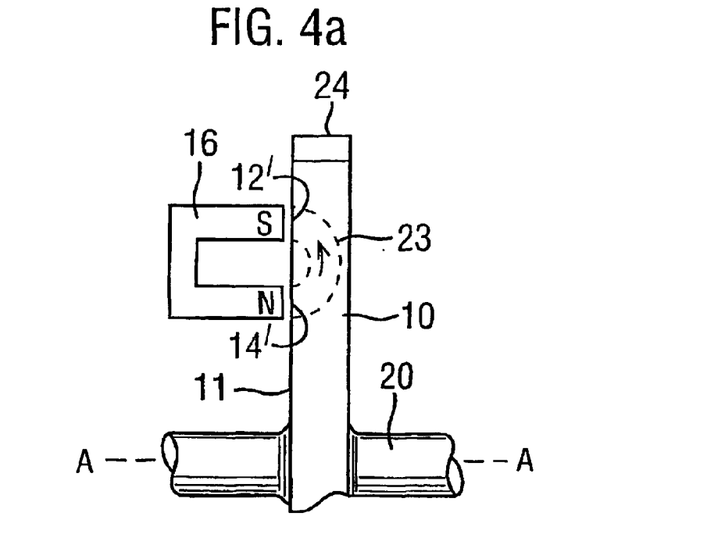
FIG. 4a shows a modification of the means for creating annular magnetised zones having a configuration similar to that of FIG. 1 by magnetising means that acts on one side only of the sprocket wheel.
Figures 4B, 4C:
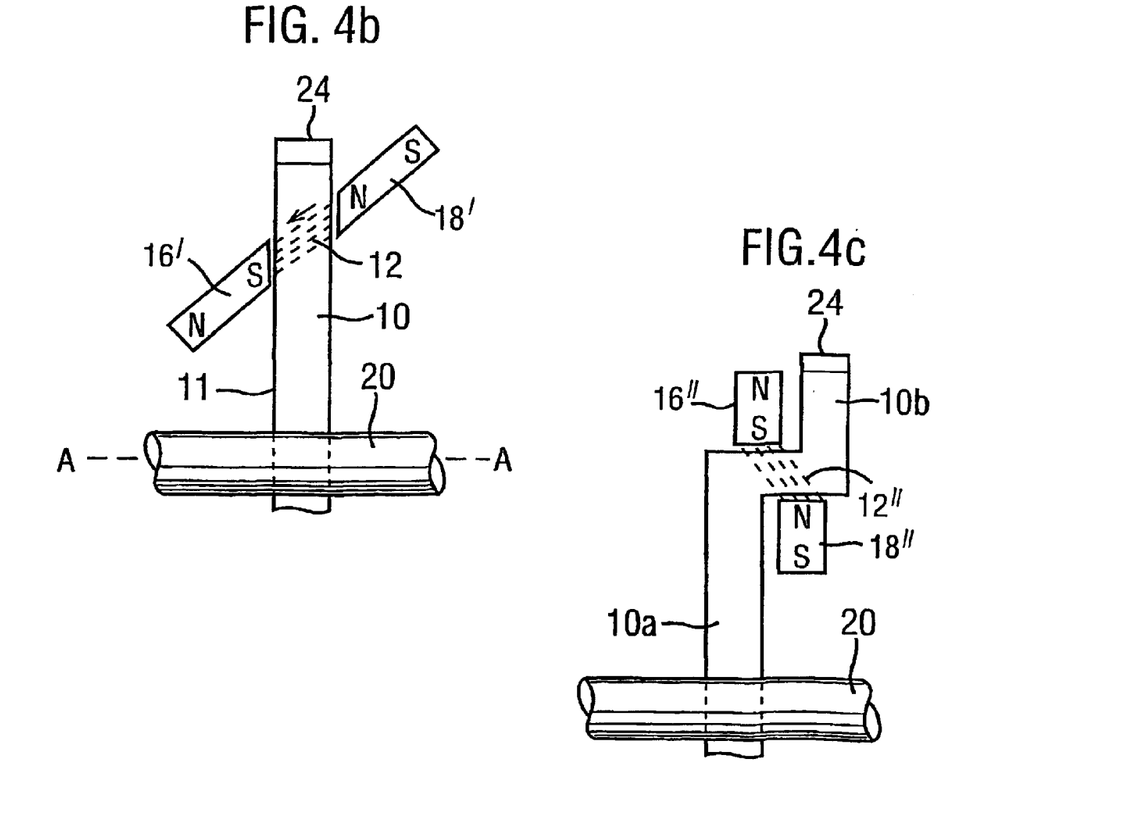
FIG. 4b shows another modification for creating a single annular magnetised zone.
FIG. 4c shows yet another modification for a stepped profile sprocketwheel.

Other modifications are possible. For example, the magnets providing the magnetising source in FIG. 2 could be replaced as indicated in FIG. 4b by a respective single magnet 16', 18' on each side of the disc 10, obliquely disposed with their poles in opposed polarity, so as to create a single annular zone, such as zone 12' at an angle to the direction of torque transmission through the disc. An alternative is to rely on a radial offsetting of the magnets to produce an oblique magnetisation in the disc. Such a zone may also be created by a single magnet pole angled with respect to the plane of the disc on one side only if the disc is thin enough and the magnet strong enough. A single magnet could also be placed parallel to the disc surface to have a flux path closed through the disc which would magnetise the disc to have two radially spaced poles, each being an annular zone.

FIG. 4c illustrates a profiled sprocket wheel having a central hub portion 10a connected to an outer toothed portion 10b by an intermediate portion 10c providing a step between the portions 10a and 10b which lie in different planes. Similarly to FIG. 4b a pair of magnets 16" and 18" are in this case offset to provide a magnetisation zone 12" at an angle to the direction of torque transmission. It will be noted that the magnets lie within the planes defined by the portions 10a and 10b.

As will appear below, for pedal cycle use magnetising sources which lie entirely on one side of the chain wheel are more easy to implement as regards not inconveniencing the cyclist. They can be placed adjacent the inside surface.

Figure 5:
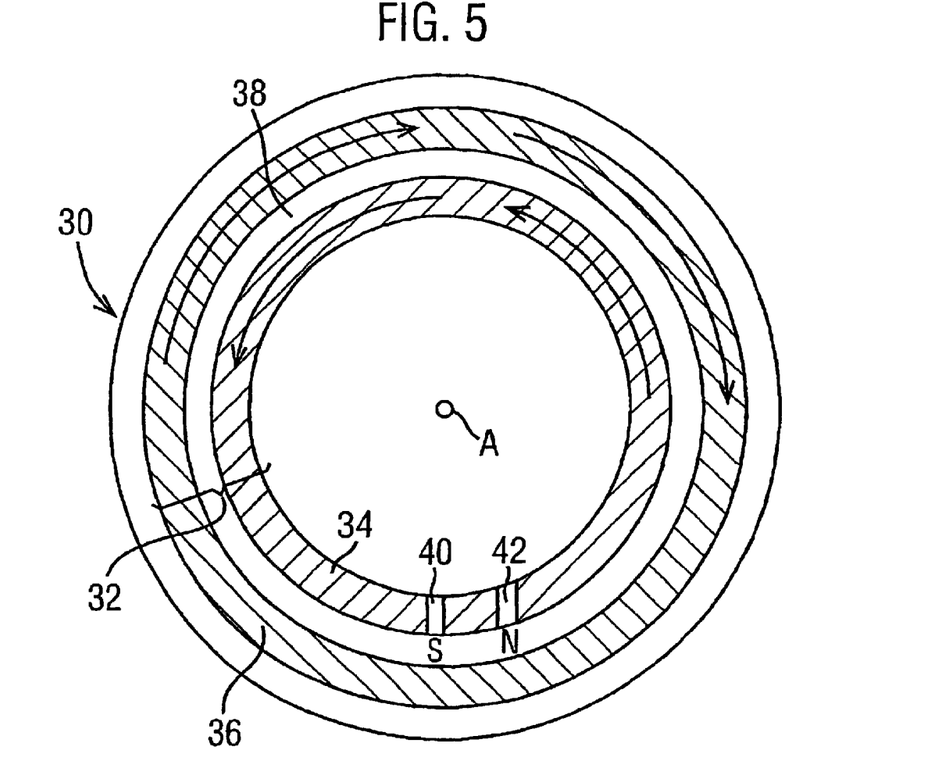
FIG. 5 is a simplified illustration of the sprocket wheel and the means for creating two annular circumferentially magnetised zones.

FIG. 5 illustrates how the torque transmitting sprocket wheel can be adapted to work with circumferential magnetisation. Circumferential (circular) magnetisation is a known phenomenon, though not in the form shown in FIG. 5. Reference may be made to the Garshelis U.S. patents mentioned below among others. FIG. 5 is a simplified face view of a disc 30 through which torque is transmitted between a drive applied on the axis A and the periphery or vice versa as previously described. In this embodiment, there is a transducer region 32 which comprises an inner annular region 34 and an outer annular region 36. The regions 34 and 36 have opposite polarities of magnetisation as indicated by the respective arrows. The circumferential magnetisation may be applied through the face 38 using a U-shape magnet arrangement in which the North and South poles are aligned normally to a radius as indicated at 40, 42 for annulus 36 rather than being aligned radially as in FIG. 2. Annulus 34 is similarly created.

In the absence of torque, the circumferential fields in regions 34 and 36 will be trapped within the annular regions. However, under torque the fields become skewed in the manner well-known with prior art circumferential transducers, e.g. Garshelis U.S. Pat. Nos. 5,351,555, 5,520,059 and 5,465,627. The consequence is that at face 38 the regions 34 and 36 develop magnetic poles of opposite polarity. The polarity is dependent on the direction of torque.

A radial measurement field Ms is generated externally of the surface 38 between regions 34 and 36, the radial magnetic flux being a function of torque. The radial flux can be sensed by one or more sensors disposed as for the radial (reference) flux in FIG. 12a, e.g. sensors 26a–d. In contrast to FIG. 1 it is seen that the detectable torque-dependent flux is radial, rather than circumferential. There is no reference field component available.

In describing the magnetising sources for the various remanent or stored magnetisation configurations, permanent magnets have been shown. The magnetising source could be realised by appropriately configured D.C. energised electromagnets. However, current magnet technology enables the provision of compact powerful permanent magnet sources. The latter have considerable advantage in implementing the automatic field refresh or compensation for a pedal cycle now to be more particularly described. What has been discussed thus far is the use of magnetic sources to initially magnetise a gear wheel or sprocket wheel, the sources then being removed so that the transducer region depends on the stored magnetisation. Consideration can now be given to the measurement of torque in the chain wheel of a cycle and other similarly powered arrangements.

DESCRIPTION OF PREFERRED EMBODIMENTS

Start with the case that FIGS. 1 and 2 represent a chain wheel. The shaft 20 is coupled to the usual pair of opposed pedal cranks and the sprocket teeth communicate the rotational drive on the sprocket wheel 10 to the cycle chain. If the sprocket wheel is of magnetisable material that has been premagnetised as described with reference to FIGS. 1 and 2 for example, torque measurement can be made by appropriate placement of magnetic field sensor devices. It is assumed here that the cycle has an appropriate source of electrical energy for the torque sensing and signal processing circuitry. In the context of motor-assisted propulsion as discussed above, there will be an electrical battery source. Sensor devices and the accompanying electronics can be made in very compact, light form and can be placed adjacent the inside surface, i.e. inner, frame-side, surface, of the chain wheel so as to be out of the way of the cyclist. The magnets and sensor(s) can be mounted to the frame.

However, potential problems arise in maintaining the stored transducer region fields in the variety of circumstances under which cycles are used. They may be left propped against metalwork of ferrous metal, possibly in the presence of magnetic fields. There is also a general problem of deterioration or leaching of the stored fields over time. In the FIG. 1 or FIG. 4 magnetisation, but not in that of FIG. 5, there is a reference field Mr against which the measured torque-dependent field Ms can be measured. However, the manner in which bicycles are used as just-mentioned raises the possibility of not only that the stored field may change over time but that the change is non-uniform around the annulus of magnetisation.

To solve this difficulty it is now proposed to provide a magnetic source adjacent the chain wheel so that the magnetisation is refreshed on each revolution of the wheel.

This solution is then implemented without any pre-magnetisation. The magnetisation is created and refreshed at a point in the circular path of the chain wheel and the torque-sensitive magnetic field is read at a subsequent point in the path. The refreshing of the magnetisation is provided at each revolution of the chain wheel. The magnetisation is of the D.C. type as discussed above and the magnetic source employed is also of this type, that is a permanent magnet or a D.C. energised electromagnet. For the application of the invention to pedal cycles, permanent magnet sources will be described. To determine the best locations for the placement of the magnetisation source and the sensor(s) for determining the effort expended by the cyclist requires an understanding of the mechanics of torque generation and transmission in cycling.

Figure 6:
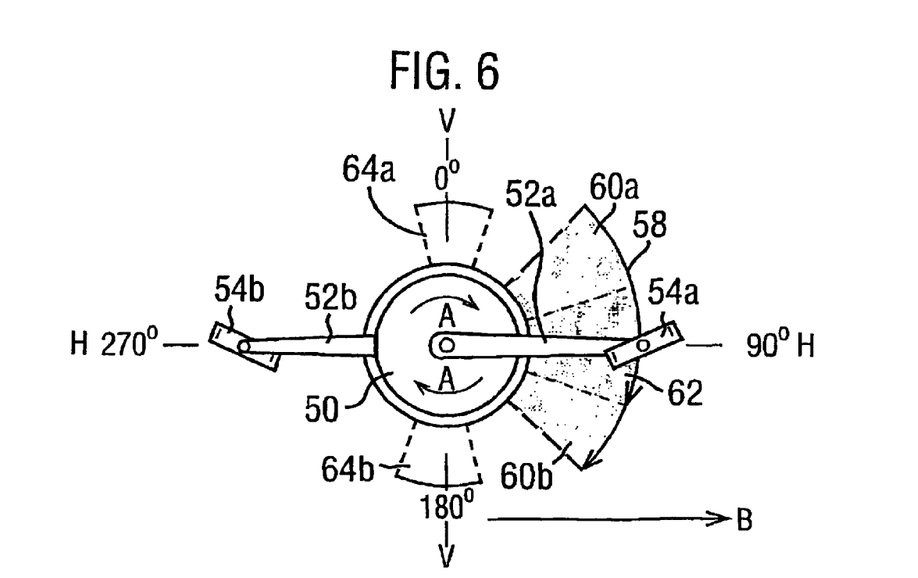
FIG. 6 is a diagrammatic representation of a pedal sprocket (chain) wheel of a bicycle and the torque generation applied to it.

FIG. 6 is a diagrammatic illustration of a chain wheel 50 and the usual two opposed pedal cranks 52a, 52b and their respective pedals 54a, 54b shown in an arbitrary position in the revolution of the wheel shown by arrows A, the cycle moving forward in the direction of arrow B. The input from the rider is essentially from the descending crank 52a. Torque is generated over an arc 58 about the horizontal axis H—H which can be divided into arcs 60a, 60b of low to medium torque preceding and succeeding the horizontal axis H—H and an arc 62 of high torque approximately centred about the horizontal axis. The arcs shown represent a general pattern which can vary from rider to rider and in dependence upon the manner in which the cycle is being ridden at any time. The torque pattern is repeated as crank 52b becomes the leading crank.

There are also arcs of minimum torque 64a, 64b about the vertical axis V—V (the top and bottom dead centre positions) of the cranks as the chain wheel 50 rotates.

Figure 7A:
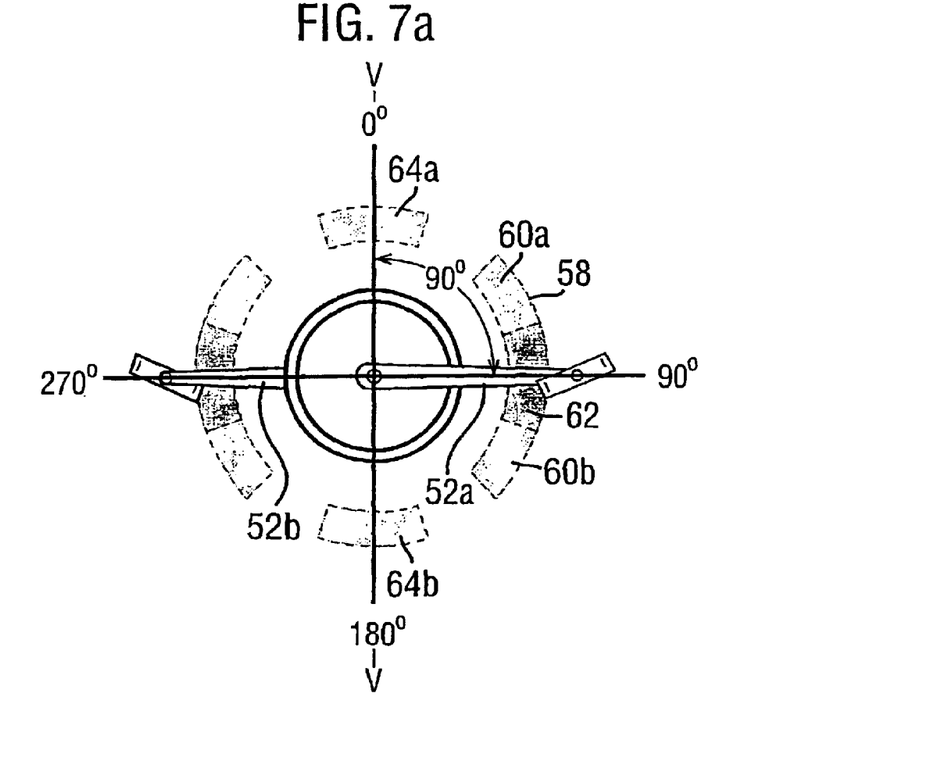
FIG. 7a illustrates the torque generation phases in a cycle of rotation in upright riding.
Figure 8:
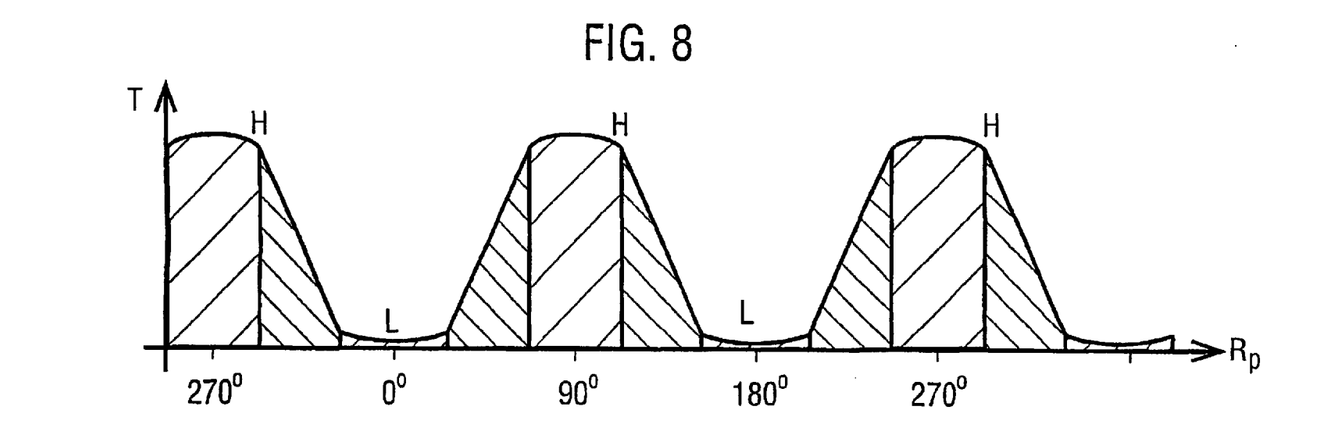
Figure 9:
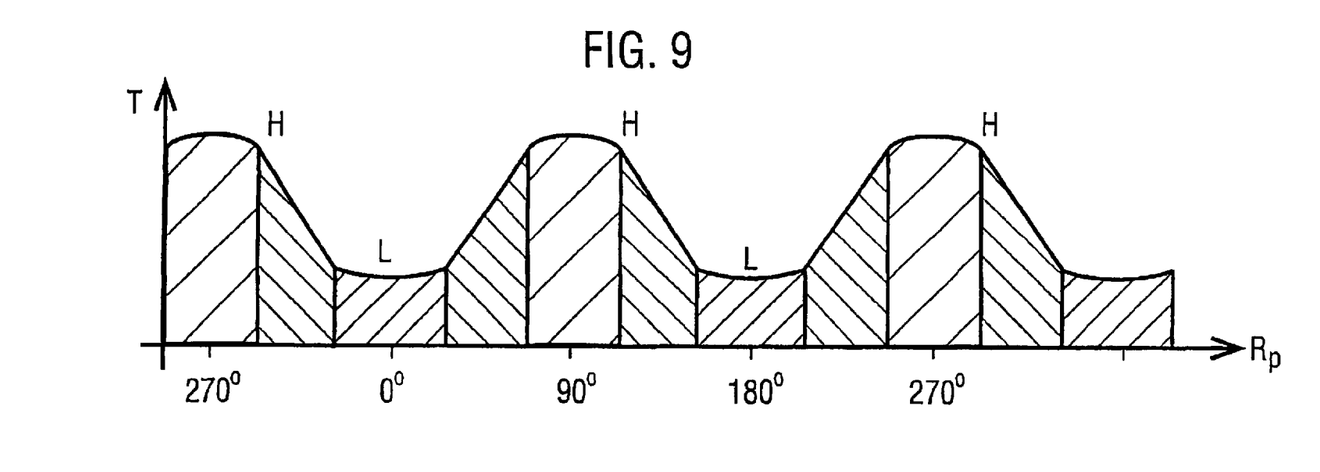

These high, low-medium and low torque phases are summarised in FIG. 7a and are graphically represented as a function of the rotational position of the pedal cranks in FIGS. 8 and 9. The angles 90° and 270° are on the horizontal axis: 0° and 180° are on the vertical axis of FIG. 6.

The rotational torque profile (torque T v. rotational position $R_p$) seen by the chain wheel 50 per full 360° revolution will include two "high" torque and two "low" torque phases, denoted "H" and "L" respectively in FIGS. 8 and 9 with about 90° spacing between a high torque phase and the following low torque phase, and vice versa. Depending on the way the cyclist is using the pedals, the low torque phase may be very close to zero, say less than 10% of the maximum torque value. This is illustrated in FIG. 8. However, another cyclist may generate a different profile with the low torque phase at about 30% of the maximum value as illustrated in FIG. 9.

Figure 7B:
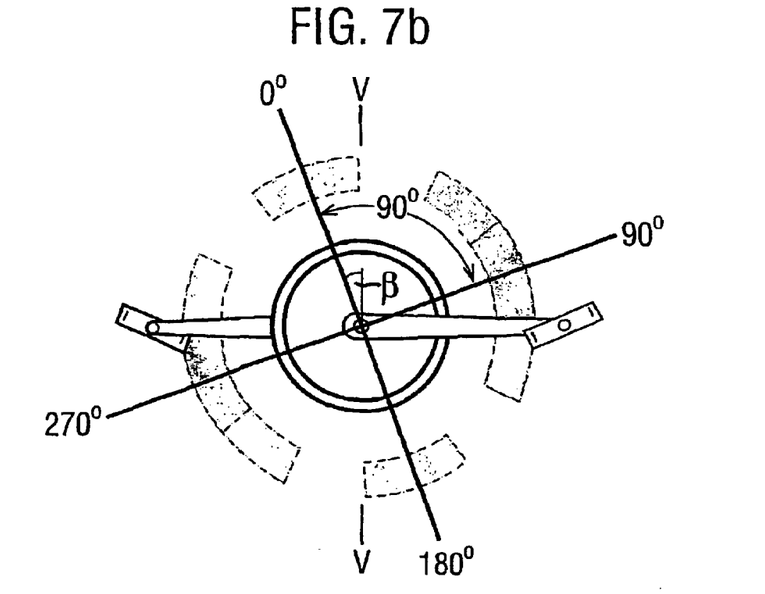
FIG. 7b illustrates the torque generation phases in a cycle of rotation in racing riding.

To illustrate the influence of the manner in which the bicycle is ridden, the distribution of the torque phases around the pedal crank cycle is as shown in FIG. 7a for normal riding in an upright position. However, for riding with greater vigour and particularly when racing, the phases will tend to displace counterclockwise as indicated in FIG. 7b by an angle β up to about 20° though the same pattern of the phases remains with the high and low phases remaining approximately 90° apart. Thus the torque variation per cycle of rotation remains similar to FIGS. 8 and 9 but with the 0° advanced by β from the vertical axis V—V, and the other rotational positions correspondingly advanced. The counter-clockwise displacement is again as looking at the outer surface of the chain wheel away from the frame.

The object in the present embodiment is to measure the maximum torque exerted by the cyclist. In turn the measured torque can then be compared with a threshold value and the comparison used to control the energisation of a motor to switch on the motor power to assist the rider when the threshold is exceeded. In order to measure the maximum torque exerted, appropriate placement is required of the magnetic field sensor and of the means for creating and refreshing the magnetic field.

Figure 10A:
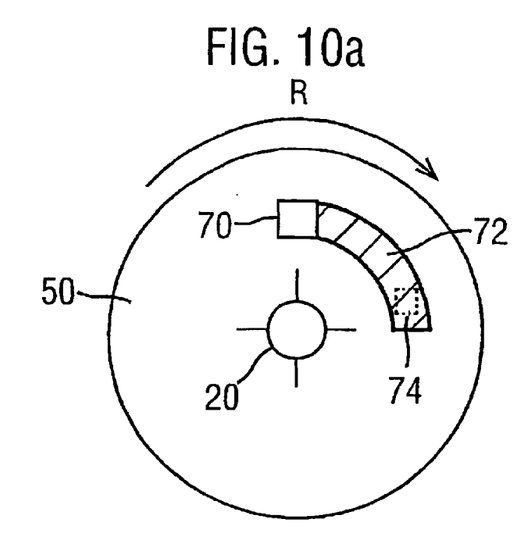
FIGS. 10a and 10b are face and in line views of the chain wheel illustrating source and sensor placement.
Figure 10B:
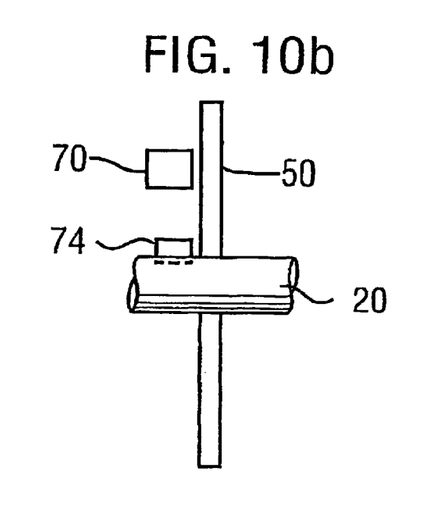

FIGS. 10a and 10b illustrate how a magnetising source 70, of whatever specific form, is placed adjacent but not contacting the inside (frame-side) surface of the chain wheel 50 so that it creates an arc of magnetisation 72 around the chain wheel which will extend a full 360° if the chain wheel is solid at the radius of the source 70 with respect to the chain wheel axis of rotation. This arc of magnetisation provides a torque-sensitive transducer zone or region from which a torque-dependent field component is emanated. The magnetisation is refreshed each time the chain wheel rotates. The direction of rotation is indicated by arrow R. It is preferred that this magnetisation be effected at a point where the chain wheel is not exposed to large torque stresses and at a point in the chain wheel rotation where the pulsating torque as shown in FIGS. 8 and 9 is at a low phase L. A sensor device(s) 74 is position normally at an angle about the shaft axis that follows the position of the source 70 in the direction of rotation so as to be responsive to the torque-dependent magnetic field emanated by the generated transducer zone 72. In contrast to the source the sensor device(s) 74 is placed at a position in the circular path at the radius of source 70, where the torque exerted by the rider is at a maximum H. The sensor device is also placed adjacent but not in contact with the inside surface of the chain wheel 50.

Figure 11:
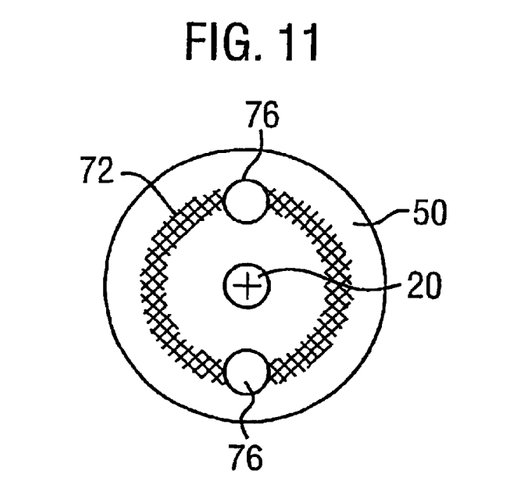
FIG. 11 shows a modification of the chain wheel to provide synchronisation/calibration.

Continuing with the solid disc chain wheel, FIG. 11 shows the introduction of synchronisation/calibration apertures 76 into the disc to intersect the magnetised zone 72.

The purpose of apertures 76 is to interrupt the normal measurement process of the magnetic field sensor(s) 74 in a regular fashion. During interruption, where the sensor is facing air, the electronic system can reset its zero-point. The dimensions and shape of the apertures are not critical as long as they are large enough for a clear signal to be obtained during the calibration check but are not so large as to prevent a proper signal being obtained during the maximum torque phase. By way of example, if the sensor device is 8 mm. in diameter, the aperture should be about 32 mm. The aperture width should be 3 to 4 times that of the sensor.

Real chain wheels for pedal bicycles usually have a more open structure with say spoke portions connecting a central hub portion on the shaft to an outer toothed annulus and through which the torque is transmitted. If the number of spokes is reduced to two, the sort of structure commonly employed is that illustrated in FIG. 12 in which a chain wheel 80 has a toothed annular portion 82 having an integral web 84 across it by which connection is made to the pedal crank shaft 20. A pair of large opposed apertures 86 are present. The pedal cranks are assumed to be in alignment with the web 84.

Figure 12:
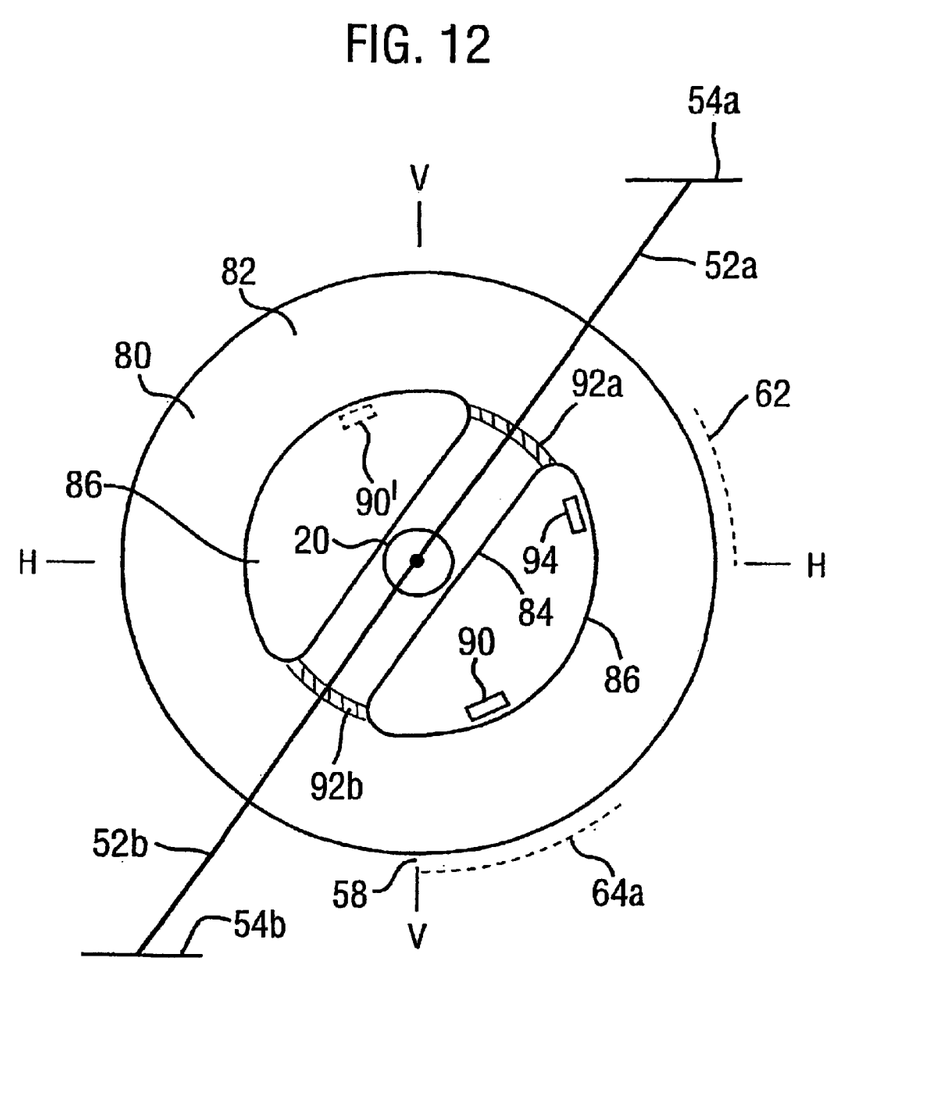
FIG. 12 illustrates another chain wheel construction.

The magnetisation source 90 is located adjacent the inner, frame-side, face of the chain wheel 80 at a radius which lies within the outer annular portion 82 so that for much of the revolution of wheel 80 the source 90 is confronted by space. It is confronted by the web 84 to establish arcuate magnetised zones 92a and 92b at opposite sides of the web. Normally the sprocket wheel 80 will be of the same material throughout but at least the portions to carry the transducer regions should be of magnetisable material or carry magnetisable material to which torque is transmitted. The source is preferably at a position about the axis of crank rotation which corresponds to a minimum torque phase. The sensor or sensors 94 for the torque-dependent field should be located at an angular position. It will be seen that the signal output from is in the form of pulses coincident with the confrontation of the sensor(s) by the web. There are two pulses per revolution. The pulse rate provides a ready means of determining the rotational speed of the pedal sprocket wheel.

The signal output from the sensor(s) 94 can also be sampled in the period it is facing an aperture. This can be used to provide a calibration reference related to other ambient parameters which may affect the output signal.

As suggested above, the automatic field refresh arrangement requires no pre-magnetisation and therefore no alignment of the magnetising source with a premagnetised transducer region. The described transducer arrangement develops its own magnetisation by the source fixedly mounted on the cycle so as to be closely adjacent the path of the relevant surface(s) of the sprocket wheel and the sensor is positioned at the same radius as the source. It may take more than one revolution of the pedal sprocket wheel to fully establish the transducer region(s) at the outset of motion.

It will be recognised that the speed (pulse rate) sensing can be utilised irrespective of whether torque measurement is being performed. If no torque measurement is required then the positioning requirements discussed above for optimum torque measurement no longer apply.

The processing of the torque measurement signal and relating it to the motor-assisted drive is outside the scope of this invention. The magnetic field sensor such as that disclosed in abovementioned publication WO98/52063 can be correlated with torque for any particular illustration. It is worth mentioning that where the torque-dependent signal is in a form that also provides speed information, such as the pulsed form above discussed, the torque and speed components are independent. For a cycle the rate of rotation of the pedal sprocket wheel is typically in the range of up to 120 rpm. The amplitude of the pulses represents torque and is independent of the pulse rate.

It is to be understood that while magnetising sources of various configurations have been llustrated in the drawings, other configurations are possible both for planar wheels and for wheels having other shapes.

What is claimed is:

1. A torque sensor arrangement for a part rotatable about an axis, the part having a portion of magnetisable material through which torque is transmitted and which has a surface, comprising a magnetising source located adjacent the path of said surface as it rotates to generate an arcuate transducer region of stored magnetisation extending inwardly from said surface, said magnetising source being configured to produce a transducer region having an external component of its magnetic field that is a function of torque, and a magnetic field sensor located adjacent the path of said surface as it rotates to produce an output signal representing said external component.

2. A torque sensor arrangement as claimed in claim 1 in which said surface extends transversely of said axis.

3. A torque sensor arrangement as claimed in claim 1 in which said part has a disc-like form.

4. A torque sensor arrangement as claimed in claim 3 in which said part is mounted for rotation about the disc axis and has drive transmitting or receiving means at its periphery.

5. A torque transducer arrangement as claimed in claim 3 in which said part comprises an outer annular portion connected to an inner hub portion by one or more spokes.

6. A torque transducer arrangement as claimed in claim 5 in which said surface is a surface of said one or more spokes.

7. A torque transducer arrangement as claimed in claim 1 in which said surface extends 360° about said axis.

8. A torque transducer arrangement as claimed in claim 1 in which said surface extends less than 360° about said axis so as to produce a pulsed output from said magnetic field sensor.

9. A torque sensor arrangement for a part rotatable about an axis, the part having a portion of magnetisable material through which torque is transmitted and which has a surface, said part having connected thereto means for applying rotational drive to said part, the drive having a cyclic pattern in each revolution of the part that includes an arc over which maximum torque is exerted on the part and an arc over which minimum torque is exerted on the part, the sensor arrangement comprising:

a magnetising source located adjacent the path of said surface as it rotates to generate an arcuate transducer region of stored magnetisation extending inwardly from said surface, said magnetising source being configured to produce a transducer region extending into said magnetisable portion from said surface and providing an external magnetic field component that is a function of torque; and     a magnetic field sensor located adjacent said surface as it rotates and spaced apart from said magnetizing source to produce an output signal representing said external field component.

10. A torque sensor arrangement as claimed in claim 9 in which said magnetic field sensor is located to sense the external magnetic field when said part is traversing said arc over which maximum torque is exerted.

11. A torque sensor arrangement as claimed in claim 10 in which said magnetic field sensor is located in said arc over which maximum torque is exerted.

12. A torque sensor arrangement as claimed in claim 9 in which said magnetic source is located to magnetise said portion when said part is traversing said arc over which minimum torque is exerted.

13. A torque sensor arrangement as claimed in claim 12 in which said magnetic source is located in said arc over which minimum torque is exerted.

14. A torque sensor arrangement as claimed in claim 9 in which said part is a chain wheel of a cycle and said drive means comprises two opposed pedal cranks and associated pedals.

15. A torque transducer arrangement as claimed in claim 1 in which said part is a chain wheel of a cycle.

16. A torque sensor arrangement as claimed in claim 9 in which said surface extends transversely of said axis.

17. A torque sensor arrangement as claimed in claim 9 in which said magnetising source comprises a permanent magnet assembly or an electromagnet assembly.

18. A torque transducer arrangement as claimed in claim 1, wherein said torque transducer arrangement is a speed sensor for measuring the rotational speed of said part.

19. A torque sensor arrangement as claimed in claim 9, wherein said torque sensor arrangement is a speed sensor for measuring the rotational speed of said part, and wherein said surface extends less than 360° about said axis.

* * * * *